US012651762B2

(12) United States Patent
Lee et al.

(10) Patent No.:  US 12,651,762 B2
(45) Date of Patent:      Jun. 9, 2026

(54) PRESSING ROLL DEVICE AND PRESSING METHOD

(71) Applicant: LG ENERGY SOLUTION, LTD., Seoul (KR)

(72) Inventors: Byeong Kyu Lee, Daejeon (KR); Soon Kwan Kwon, Daejeon (KR); Won Nyeon Kim, Daejeon (KR); Su Taek Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 515 days.

(21) Appl. No.: 17/782,819

(22) PCT Filed: Jul. 10, 2020

(86) PCT No.: PCT/KR2020/009068
§ 371 (c)(1),
(2) Date: Jun. 6, 2022

(87) PCT Pub. No.: WO2021/117998
PCT Pub. Date: Jun. 17, 2021

(65) Prior Publication Data
US 2023/0043253 A1      Feb. 9, 2023

(30) Foreign Application Priority Data

Dec. 13, 2019    (KR) ........................ 10-2019-0167120

(51) Int. Cl.
*H01M 10/04*          (2006.01)
(52) U.S. Cl.
CPC ... *H01M 10/0404* (2013.01); *H01M 10/0468* (2013.01)

(58) Field of Classification Search
CPC .......... H01M 10/0404; H01M 10/0468; B32B 37/0046; B30B 9/241
See application file for complete search history.

(56) References Cited

U.S. PATENT DOCUMENTS 4,656,736  A        4/1987   Volkhin et al.
2009/0325045  A1    12/2009   Miyahisa et al.
(Continued)

FOREIGN PATENT DOCUMENTS

CN        104511944  A      4/2015
CN        109346667  A   *  2/2019   .......... H01M 4/0435
(Continued)

OTHER PUBLICATIONS

WO2019187994A1 Machine Translation (Year: 2019).*
(Continued)

*Primary Examiner* — Brian R Ohara
*Assistant Examiner* — Quintin D. Elliott
(74) *Attorney, Agent, or Firm* — Birch, Stewart, Kolasch & Birch, LLP

(57)          ABSTRACT

A pressing roll device, in which a unit cell passes between an upper roll and a lower roll, includes: the lower roll; the upper roll; a lower mount on which the lower roll is mounted and which is fixed in movement; an upper mount on which the upper roll is mounted and which is restricted by a bracket so as to ascend and descend by the bracket; and a stopper disposed between the lower mount and the upper mount so that the lower roll and the upper roll are spaced apart from each other.

16 Claims, 6 Drawing Sheets

(56) References Cited

U.S. PATENT DOCUMENTS

| | | |
|---|---|---|
| 2014/0352138 A1 | 12/2014 | Yasooka et al. |
| 2015/0090089 A1 | 4/2015 | Horii et al. |
| 2018/0076442 A1 | 3/2018 | Choi et al. |
| 2021/0114071 A1 | 4/2021 | Nakajima |

FOREIGN PATENT DOCUMENTS

| | | | |
|---|---|---|---|
| EP | 2 860 001 A1 | | 4/2015 |
| JP | 2000-11999 A | | 1/2000 |
| JP | 2001246403 A | * | 9/2001 |
| JP | 2002-93408 A | | 3/2002 |
| JP | 2005-288535 A | | 10/2005 |
| JP | 2011-79224 A | | 4/2011 |
| JP | 2012-111647 A | | 6/2012 |
| JP | 2013-6371 A | | 1/2013 |
| JP | 2013-65400 A | | 4/2013 |
| JP | 2013-165037 A | | 8/2013 |
| JP | 5328876 B2 | | 10/2013 |
| JP | 2015-66665 A | | 4/2015 |
| JP | 2016203242 A | * | 12/2016 |
| JP | 2019-102172 A | | 6/2019 |
| JP | 2019-104031 A | | 6/2019 |
| KR | 10-2009-0110822 A | | 10/2009 |
| KR | 10-2012-0095160 A | | 8/2012 |
| KR | 10-1963763 B1 | | 3/2019 |
| WO | WO-2019187994 A1 | * | 10/2019 ............ B21B 37/58 |

OTHER PUBLICATIONS

JP-2001246403-A Machine Translation.*
JP-2016203242-A Machine Translation.*
CN-109346667-A Machine Translation.*
Extended European Search Report for European Application No. 20899932.6, dated Nov. 29, 2022.
International Search Report for PCT/KR2020/009068 mailed on Oct. 15, 2020.

* cited by examiner (a)  (b)

<Structure according
to related art>

<Structure according
to the present invention>

PRESSING ROLL DEVICE AND PRESSING METHOD

CROSS-REFERENCE TO RELATED APPLICATION

The present application claims the benefit of the priority of Korean Patent Application No. 10-2019-0167120, filed on Dec. 13, 2019, which is hereby incorporated by reference in its entirety.

TECHNICAL FIELD

The present invention relates to a pressing roller device that applies a pressure to a unit cell to press the unit cell when the unit cell in which electrodes (a positive electrode and a negative electrode) and separators are stacked is manufactured, and a pressing method using the pressing roll device, and more particularly, to a pressing roll device and a pressing method, in which when an electrode and a separator enter the pressing roll device in a stacked state, the electrode and the separator enter the pressing roll device in a state in which an upper roll and a lower roll are spaced apart from each other to minimize damage of the electrode and the separator.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Such a secondary battery is configured so that an electrode assembly is embedded in a battery case (for example, a pouch, a can, and the like). The electrode assembly mounted in the battery case is repeatedly chargeable and dischargeable because of a structure in which a positive electrode/a separator/a negative electrode are repeatedly stacked. The electrode assembly is manufactured in various manners. However, generally, the electrode assembly may be manufactured in a manner in which, after a unit cell is prepared in advance, a plurality of unit cells are stacked to manufacture the electrode assembly.

The process of manufacturing the unit cell comprises a laminating process for bonding a separator to an electrode. In the laminating process, a negative electrode, a separator, and a positive electrode, each of which is wound in the form of a roll, are continuously unwound to be supplied. Here, two or more separators are normally supplied continuously, and the positive electrode and the negative electrode are supplied to be stacked between the separators and on the uppermost separators. That is, each of the positive electrode and the negative electrode is cut by a predetermined size and then put so that the positive electrodes and the negative electrodes are alternately stacked with the separators therebetween.

Also, the separators are continuously connected to each other to pass through the laminating device in the state in which the positive electrode and the negative electrode are alternately stacked between the separators. In the laminating device, heat and a pressure are applied to bond the positive electrode, the separator, and the negative electrode to each other. Also, after passing through the laminating device, the separator is cut to be manufactured into individual unit cells.

Here, the laminating device comprises a pressing roll device in which the positive electrode, the separator, and the negative electrode pass between two rolls and thus are pressed.

Referring to FIG. 1, (a) of FIG. 1 illustrates a state in which an upper roll and a lower roll contact each other and (b) of FIG. 1 illustrates a state in which the upper roll and the lower roll are spaced apart from each other in the pressing roll device according to the related art, the pressing roll device according to the related art comprises an upper roll 2a and a lower roll 1a, which are disposed vertically when a positive electrode, a separator, and a negative electrode pass through the pressing roll device in a state of being stacked. The lower roll 1a is rotatably mounted on a lower mount 1, and the upper roll 2a is rotatably mounted on an upper mount 2. Here, the lower mount 1 is fixed in movement, but the upper mount 2 is connected to a motor 4 through a bracket 3 and a screw 5 to ascend and descend according to a rotation direction of the motor 4.

However, in such a structure, it is difficult to maintain a constant distance between the upper roll 2a and the lower roll 1a due to vibration (and an impact) generated by mechanical devices during the laminating process. In addition, when deviation in thickness occurs, there is a risk of damage or deformation due to an excessive pressure applied to the positive electrode and the negative electrode, which are stacked.

In order to solve the above problems, if the upper roll 2a and the lower roll 1a are spaced too far apart from each other, a pressure for the pressing is reduced to deteriorate bonding force.

DISCLOSURE OF THE INVENTION

Technical Problem

Therefore, a main object of the present invention is to provide a pressing roll device and a pressing method, which are capable of solving or at least improving the above problems that may occur in the pressing roll device according to the related art.

Technical Solution

A pressing roll device, in which a unit cell passes between an upper roll and a lower roll, according to the present invention for achieving the above object comprises: the lower roll; the upper roll; a lower mount on which the lower roll is mounted and which is fixed in movement; an upper mount on which the upper roll is mounted and which is restricted by a bracket so as to ascend and descend by the bracket; and a stopper disposed between the lower mount and the upper mount so that the lower roll and the upper roll are spaced apart from each other.

Here, the upper mount may comprise a head part protruding from a top surface of the upper mount, the head part may comprise a body portion protruding vertically from the top surface of the upper mount and an expansion portion, having a diameter greater than the body portion, at an upper end of the body portion, and the head portion may be coupled so that separation of the expansion portion is restricted by a clamping portion of the bracket, wherein, the upper mount may ascend and descend in the state in which the head part is restricted within a range in which a bottom surface of the clamping portion contacts the top surface of the upper mount, or a top surface of the clamping portion contacts the expansion portion.

When the upper mount is seated on the stopper, a gap may occur between the clamping portion and the expansion portion and between the clamping portion and the top surface of the upper mount.

The bracket may be connected to a motor to ascend and descend according to a rotation direction of the motor.

A damping member that buffers an impact when the upper mount is seated may be mounted on the stopper.

In the present invention, the stopper may have a bar shape that is vertically erected from the lower mount and be expandable and contractible in a longitudinal direction to adjust a spaced distance between the lower mount and the upper mount.

The stopper may comprise: a fixed part fixedly disposed on the lower mount; and a sliding part that is slidable to ascend and descend in the longitudinal direction from the fixed part. The sliding of the sliding part may be performed through the motor in addition to a pneumatic or hydraulic pressure.

Furthermore, the present invention may additionally provide a pressing method for pressing a unit cell between an upper roll and a lower roll. A pressing method, in which a unit cell passes to be pressed between an upper roll and a lower roll, according to the present invention comprises: a step of passing the unit cell between the lower roll mounted on a lower mount that is fixed in movement and the upper roll mounted on an upper mount which is capable of ascending and descending in a state in which separation from the bracket is restricted, wherein, when the unit cell passes between the upper roll and the lower roll, the upper roll and the lower roll are spaced a predetermined distance from each other.

Here, when the unit cell passes between the upper roll and the lower roll, a pressure is applied to the unit cell by self-weights of the upper mount and the upper roll.

When the unit cell having a predetermined thickness passes between the upper roll and the lower roll, only the self-weights of the upper mount and the upper roll may act as the pressure applied to the unit cell, wherein if the unit cell having a thickness greater than the predetermined thickness passes between the upper roll and the lower roll, force applied from the bracket in addition to the self-weights of the upper mount and the upper roll may be added to act as the pressure applied to the unit cell.

The pressing method may further comprises a step of mounting a stopper between the lower mount and the upper mount before the unit cell passes therethrough so that the lower roll and the upper roll are spaced apart from each other.

Therefore, the present invention may additionally provide the unit cell manufactured by the pressing method as described above.

Advantageous Effects

In the present invention having the configuration as described above, the stopper that is capable of ascending and descending may be disposed between the lower mount and the upper mount to more easily and reliably maintain the distance between the upper roll and the lower roll, and the stopper may be adjustable in length to adjust the distance between the upper roll and the lower roll.

Here, when the upper mount is seated on the stopper, the upper mount may be seated so that the gap occurs between the clamping portion and the expansion portion and between the clamping portion and the top surface of the upper mount. Thus, the stopper may support only the loads of the upper mount and the upper roll to minimize the damage of the electrode when the electrode passes therethrough. That is, in the structure according to the related art, the fixing force between the upper mount and the motor may act as the pressure on the electrode. However, in the present invention, the initial pressure applied to the electrode may be lowered, and if necessary, the pressure transmitted to the motor may be added.

Also, the damping member that buffers the impact when the upper mount is seated may be mounted on the stopper to prevent the durability from being deteriorated due to the impact.

BRIEF DESCRIPTION OF THE DRAWINGS (a) of FIG. 1 is a view illustrating a state in which an upper roll and a lower roll contact each other and (b) of FIG. 1 is a state in which the upper roll and the lower roll are spaced apart from each other in a pressing roll device according to the related art.

MODE FOR CARRYING OUT THE INVENTION

Figure 1:
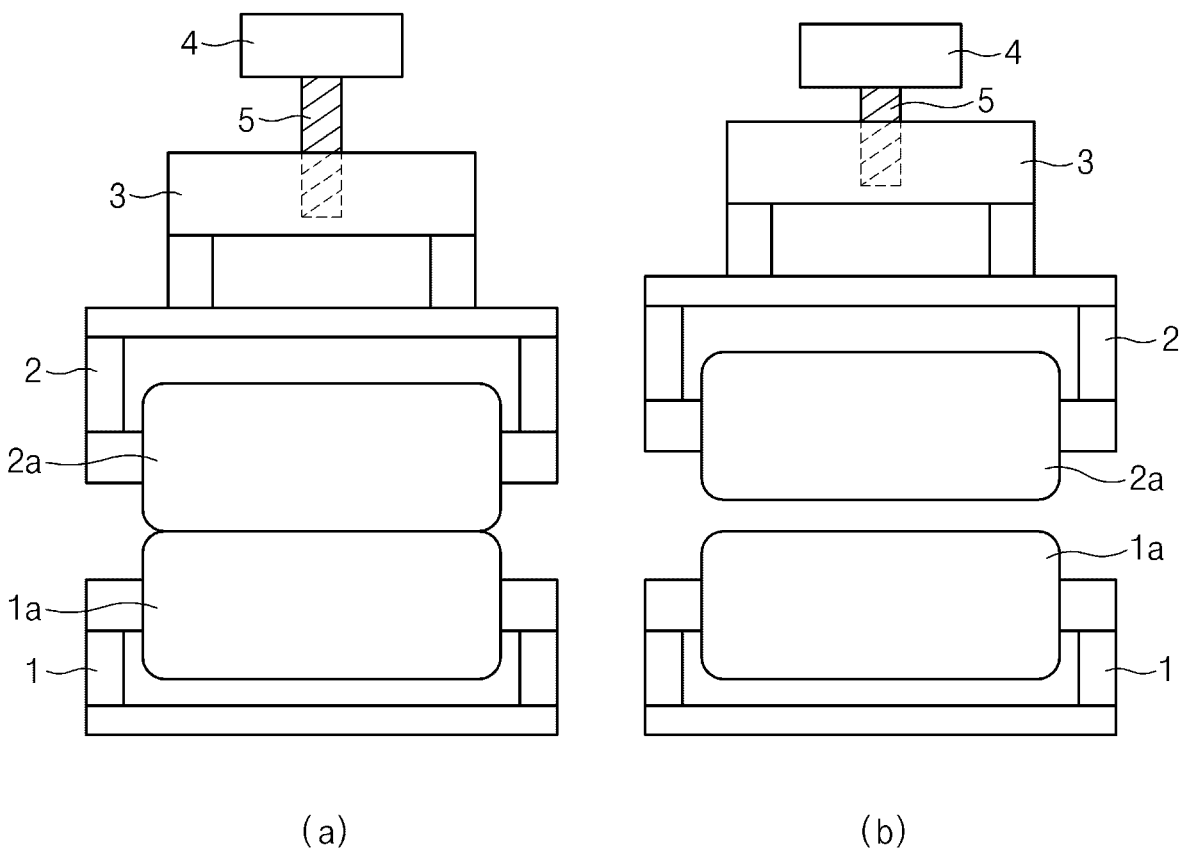

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a pressing roll device, which is provided in a laminating device for manufacturing a unit cell so that the unit cell passes between an upper roll and a lower roll, and a pressing method. Hereinafter, embodiments of the present invention will be described in more detail with reference to the accompanying drawings.

First Embodiment

The present invention provides a pressing roll device for passing a unit cell between an upper roll 21 and a lower roll 11 as a first embodiment.

Figure 2:
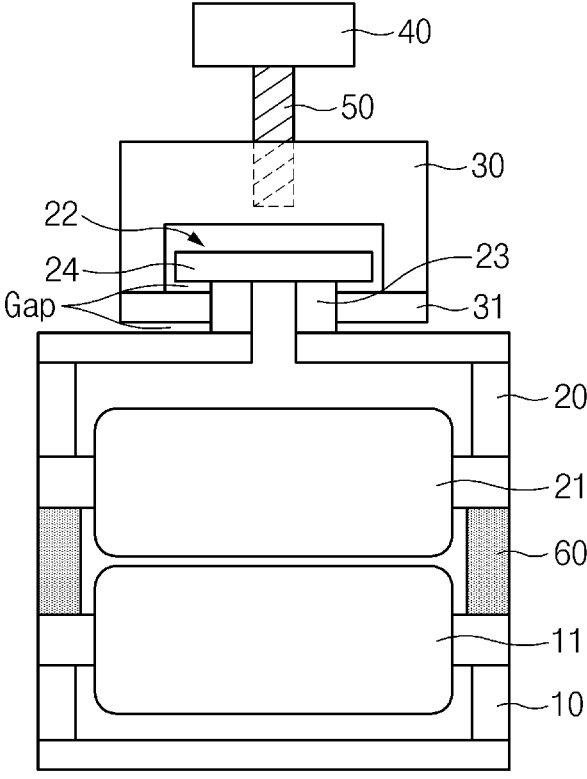
FIG. 2 is a view illustrating a state in which an upper mount descends to the lowermost side in a pressing roller device according to the present invention.
Figure 3:
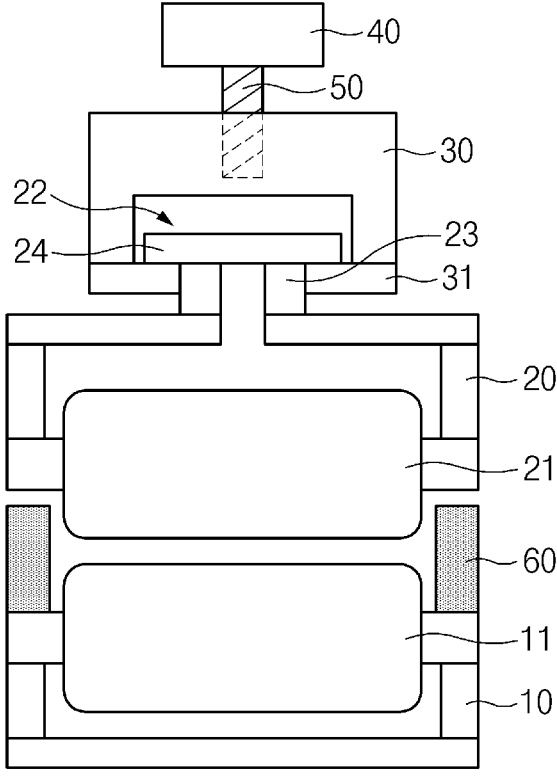
FIG. 3 is a view illustrating a state in which the upper mount ascends in FIG. 2.

FIG. 2 is a view illustrating a state in which an upper mount 20 descends to the lowermost side in a pressing roller device according to the present invention, and FIG. 3 is a view illustrating a state in which the upper mount 20 ascends in FIG. 2.

Referring to FIGS. 2 and 3, the pressing roll device of the present invention comprises an upper mount 20 and a lower mount 10 to which an upper roll 21 and a lower roll 11 are coupled, respectively.

Each of the upper roll 21 and the lower roll 11 is made of a material having stiffness that is enough to apply an appropriate pressure to an electrode and a separator and has a cylindrical shape. Also, the upper mount 20 and the lower mount 10 are mounted so that the upper roll 21 and the lower roll 11 are rotatable at centers of both surfaces of the upper and lower mounts 20 and 10, respectively.

That is, the lower mount 10 is fixed in movement so that the lower roll 11 is mounted to be rotatable. On the other hand, likewise, the upper roll 21 is mounted on the upper mount 20 so as to be rotatable. Here, the upper mount 20 may be restricted in behavior and separation by a bracket 30 and also may ascend and descend by the bracket 30.

Also, a stopper 60 is disposed between the lower mount 10 and the upper mount 20 so that the lower roll 11 and the upper roll 21 are spaced apart from each other.

In the present invention, a head part 22 protrudes from a top surface of the upper mount 20. The head part 22 comprises a body portion 23 protruding vertically from the top surface of the upper mount 20 and an expansion portion 24 of which a diameter increases at an upper end of the body portion 23. Also, the bracket 30 is provided with a clamping portion 31 facing a lower side, and the head part 22 is coupled so that the separation of the expansion portion 24 is restricted by the clamping portion 31 of the bracket 30. As illustrated in the drawings, the bracket 30 has a space in which the head part 22 is accommodated, and the clamping portion 31 supports the head part 22 so that the bracket 22 is not separated downward when the head part 22 enters the space.

Here, in a state in which the bracket 30 is fixed, the upper mount 20 may ascend and descend in the state in which the head part 22 is restricted within a range in which a bottom surface of the clamping portion 31 contacts the top surface of the upper mount 20, or a top surface of the clamping portion 31 contacts the expansion portion 24. That is, the range of the ascending and descending is proportional to a length of the body portion 23.

When the upper mount 20 is seated on the stopper 60 according to the length of the stopper 60 in the state in which the height of the bracket 30 is fixed, the clamping portion 31 is disposed so that a gap occurs between the clamping portion 31 and the expansion portion 24 and between the clamping portion 31 and the top surface of the upper mount 20.

That is, in the case of the above arrangement, when the electrode and the separator pass through the upper roll 21 and the lower roll 11, only weights of the upper roll 21 and the upper mount 20 act as a pressure. Also, when the bracket 30 descends to allow the clamping portion 31 to press the top surface of the upper mount 20, force transmitted through the bracket 30 is further added to act as a pressure on the electrode and the separator.

The bracket 30 is configured to ascend and descend by the motor 40. The motor 40 and the bracket 30 are connected to each other through a screw 50 that converts rotational force of the motor 40 into an ascending and descending motion of the bracket 30. Thus, the bracket 30 ascends and descends according to the rotation direction of the motor 40. For reference, instead of the motor 40, the bracket 30 may be configured to ascend and descend by a pneumatic or hydraulic pressure. However, it is preferable that the bracket 30 is configured to ascend and descend by the rotation of the motor 40 so as to more precisely and quickly control a rotation rate.

Figure 4:
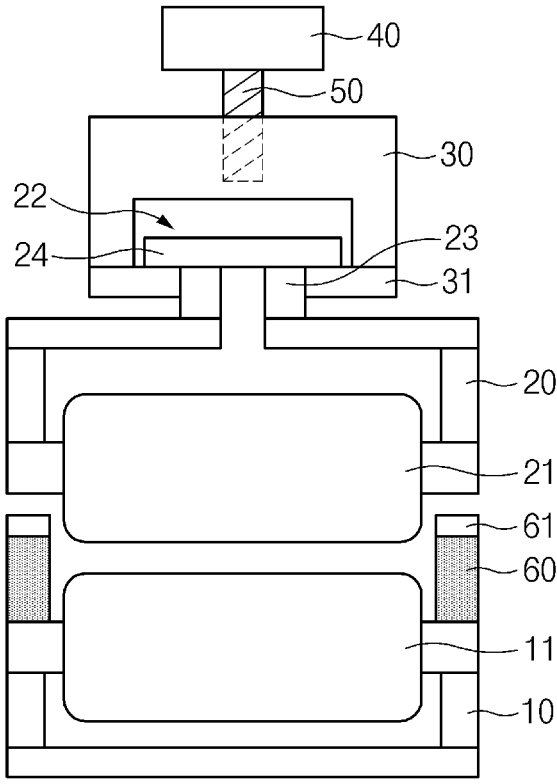
FIG. 4 is a side view illustrating a state in which a damping member is mounted on a stopper.

Furthermore, when the upper mount 20 is seated on the stopper 60, a damping member 61 may be mounted on the stopper 60 so as to suppress an occurrence of impact noise and improve mechanical durability. That is, as illustrated in FIG. 4, which illustrates a state in which the damping member 61 is mounted on an upper end of the stopper 60, the damping member 61 for buffering an impact may be additionally provided at one or more ends of the upper end and the lower end of the stopper 60.

Figure 5:
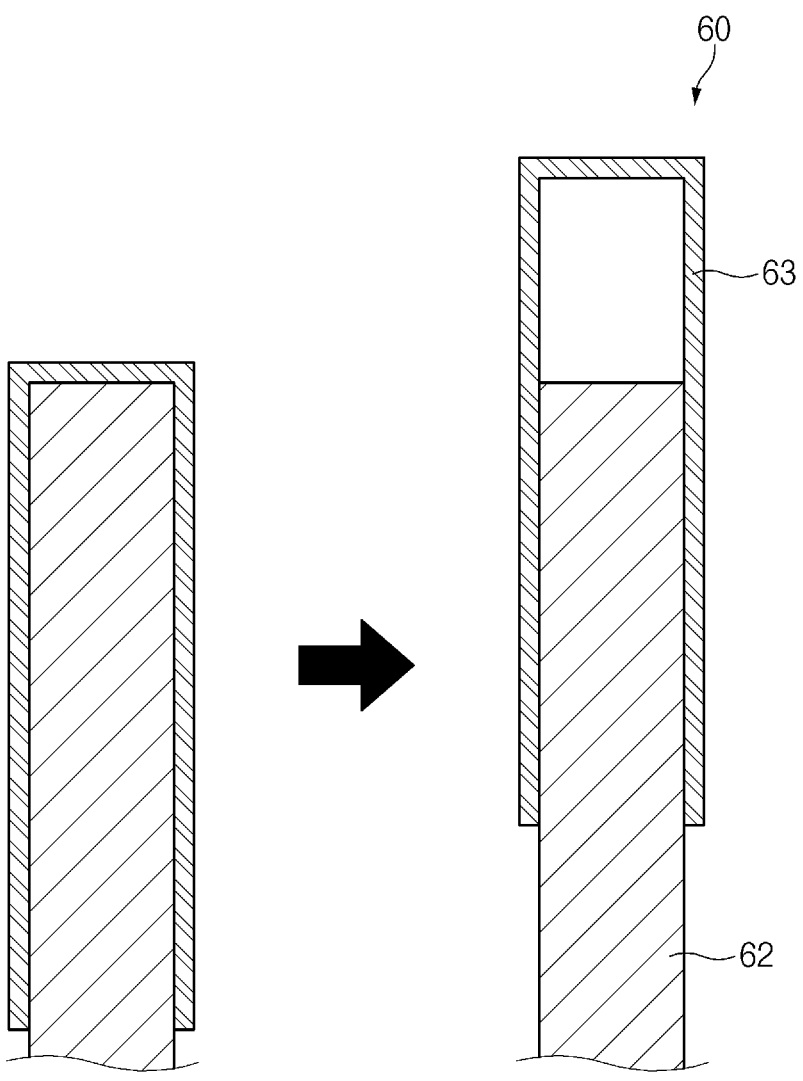
FIG. 5 is a view illustrating a state in which a sliding part ascends from a fixed part of the stopper to increase in length of the stopper.

Also, in the present invention, the stopper 60 may be expanded and contracted in a longitudinal direction to adjust a distance between the upper mount 20 and the lower mount 10. That is, as illustrated in FIG. 5, which illustrates a state in which the stopper 60 increases in length due to the ascending of a sliding part 63 from the fixed part 62 of the stopper 60, the stopper 60 of the present invention may comprise a fixed part 62 and a sliding part 63.

The fixed part 62 has a bar shape that is vertically erected from the lower mount 10 and is fixedly coupled to the lower mount 10. Also, the sliding part 63 is configured to be slidable so as to ascend and descend in the longitudinal direction from the fixed part 62. The sliding part 63 and the fixed part 62 may be configured so that the sliding part 63 ascends and descends by injecting compressed air into an inner space between the sliding part 63 and the fixed part 62 or by mounting a rack gear and a pinion gear in the inner space to allow the rack gear and the pinion gear to rotate by a motor.

Figure 6:
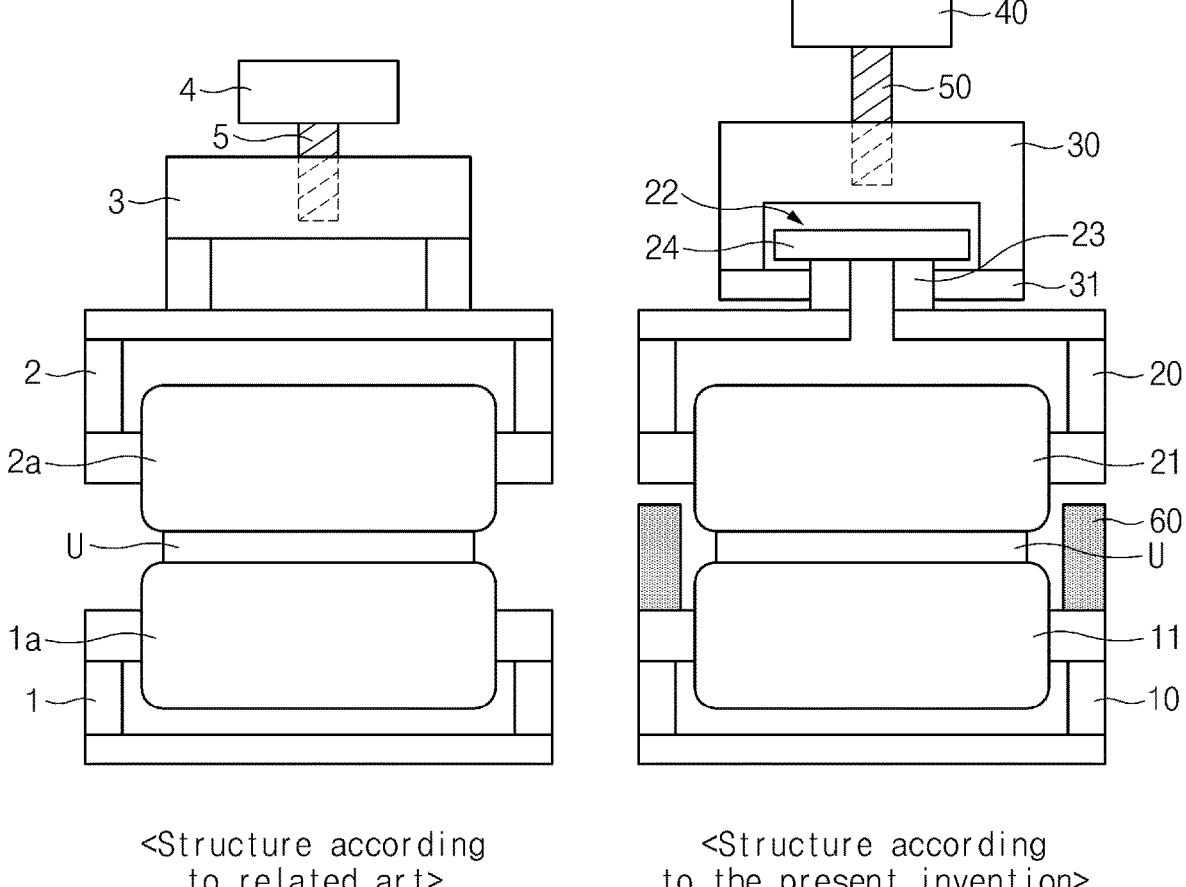
FIG. 6 is a view comparing the pressing roll device (left) according to the related art to the pressing roll device (right) according to the present invention.

In the pressing roll device of the present invention having the above configuration, as illustrated in FIG. 6, in which the pressing roll device (left) according to the related art and the pressing roll device (right) according to the present invention are compared, when an unit cell U passes through the upper roll 21 and the lower roll 11, a clearance in which the upper mount 20 is capable of ascending may be provided to prevent an electrode provided in the unit cell U from being damaged and separated from its regular position.

Second Embodiment

Furthermore, the present invention provides a pressing method for pressing a unit cell between an upper roll and a lower roll by using the pressing roll device provided in the first embodiment of the present invention, as a second embodiment.

The pressing method according to the present invention is a pressing method for pressing a unit cell U by allowing the unit cell U to pass between an upper roll 21 and a lower roll 11. The pressing method comprises a step of allowing the unit cell U to pass between the lower roll 11 mounted on a lower mount that is fixed in movement and the upper roll 21 mounted on an upper mount 20 which is capable of ascending and descending in a state in which separation from the bracket 30 is restricted.

Here, when the unit cell U passes between the upper roll 21 and the lower roll 11, the upper roll 21 and the lower roll 11 are spaced a predetermined distance from each other. That is, in the method according to the related art, the upper roll and the lower roll may contact each other, and when the electrode of the unit cell passes, a load is concentrated into edge portions of the negative electrode and the positive electrode, which are stacked in the unit cell, to cause the damage of the positive electrode and the negative electrode or the separation of each of the positive electrode and the negative electrode from the seated position thereof. However, in the present invention, since the upper roll 21 and the lower roll 11 are spaced apart from each other, an amount of impact that is initially applied to the negative electrode and the positive electrode may be reduced.

Here, since the upper mount 20 is restricted by the bracket 30 and capable of ascending and descending within a predetermined range (by a gap occurring between the clamping portion and the expansion portion and between the clamping portion and the top surface of the upper mount), the pressure applied to the unit cell acts as a self-weight of each of the upper mount 20 and the upper roll 21.

When the unit cell having a predetermined thickness passes between the upper roll 21 and the lower roll 11, only the self-weights of the upper mount 20 and the upper roll 21 may act as the pressure applied to the unit cell. If the unit cell having a thickness greater than the predetermined thickness passes between the upper roll 21 and the lower roll 11, force applied from the bracket 30 in addition to the self-weights of the upper mount 20 and the upper roll 21 may be added to act as the pressure applied to the unit cell.

Therefore, the present invention may comprise a step of mounting a stopper 60 between the lower mount 10 and the upper mount 20 before the unit cell passes therethrough so that the lower roll 11 and the upper roll 21 are spaced apart from each other.

Furthermore, the present invention may additionally provide the unit cell manufactured by the pressing method as described above.

In the present invention having the configuration as described above, the stopper 60 that is capable of ascending and descending may be disposed between the lower mount 10 and the upper mount 20 to more easily and reliably maintain the distance between the upper roll 21 and the lower roll 11, and the stopper 60 may be adjustable in length to adjust the distance between the upper roll 21 and the lower roll 11.

Here, when the upper mount 20 is seated on the stopper 60, the upper mount 20 may be seated so that the gap occurs between the clamping portion 31 and the expansion portion 24 and between the clamping portion 31 and the top surface of the upper mount 20. Thus, the stopper 60 may support only the loads of the upper mount 20 and the upper roll 21 to minimize the damage of the electrode when the electrode passes therethrough. That is, in the structure according to the related art, the fixing force between the upper mount and the motor may act as the pressure on the electrode. However, in the present invention, the initial pressure applied to the electrode may be lowered, and if necessary, the pressure transmitted to the motor may be added.

Also, the damping member 61 that buffers the impact when the upper mount 20 is seated may be mounted on the stopper 60 to prevent the durability from being deteriorated due to the impact.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A pressing roll device, in which a unit cell passes between an upper roll and a lower roll, the pressing roll device comprising:
    the lower roll;
    the upper roll;
    a lower mount on which the lower roll is mounted and which is fixed in movement;
    a bracket having an internal space, and positioned above the lower mount;
    an upper mount on which the upper roll is mounted and which is restricted by the bracket so as to ascend and descend by the bracket; and
    a stopper disposed between the lower mount and the upper mount so that the lower roll and the upper roll are spaced apart from each other,
    wherein the upper mount comprises a head part protruding from a top surface of the upper mount,
    wherein the head part comprises a body portion protruding vertically from the top surface of the upper mount and an expansion portion, the expansion portion having a diameter greater than the body portion, at an upper end of the body portion,
    wherein the head part is coupled to the bracket and the expansion portion of the head part is accommodated in the internal space of the bracket so that separation of the expansion portion is restricted by a clamping portion of the bracket,
    wherein, the upper mount ascends and descends in a state in which the head part is restricted and travels within the internal space between an upper surface of the internal space and a lower surface of the internal space which corresponds to a range in which a bottom surface of the clamping portion contacts the top surface of the upper mount and a top surface of the clamping portion contacts a bottom surface of the expansion portion, respectively,
    wherein the body portion includes at least two parts that extends parallel to each other,
    wherein the two parts of the body portion are respectively connected to the upper mount, and
    wherein the upper mount includes a gap between locations where the two parts of the body portion are respectively connected to the upper mount.

2. The pressing roll device of claim 1, wherein, when the upper mount is seated on the stopper, a gap occurs between the clamping portion and the expansion portion and between the clamping portion and the top surface of the upper mount so that the head part is located between the upper surface of the internal space and the lower surface of the internal space.

3. The pressing roll device of claim 1, wherein the bracket is connected to a motor to ascend and descend according to a rotation direction of the motor.

4. The pressing roll device of claim 1, wherein a damping member that buffers an impact when the upper mount is seated is mounted on the stopper.

5. The pressing roll device of claim 1, wherein the stopper has a bar shape that is erected from the lower mount and is expandable and contractible in a longitudinal direction to adjust a spaced distance between the lower mount and the upper mount.

6. The pressing roll device of claim 5, wherein the stopper comprises:
    a fixed part fixedly disposed on the lower mount; and
    a sliding part that is slidable to ascend and descend in the longitudinal direction from the fixed part.

7. A pressing method using the pressing roll device of claim 1 that includes the unit cell that passes to be pressed between the upper roll and the lower roll, the pressing method comprising:

an operation of passing the unit cell between the lower roll mounted on the lower mount that is fixed in movement and the upper roll mounted on the upper mount which is capable of ascending and descending in a state in which separation from the bracket is restricted, wherein, when the unit cell passes between the upper roll and the lower roll, the upper roll and the lower roll are spaced a predetermined distance from each other.

8. The pressing method of claim 7, wherein, when the unit cell passes between the upper roll and the lower roll, a pressure is applied to the unit cell by self-weights of the upper mount and the upper roll.

9. The pressing method of claim 8, wherein, when the unit cell having a predetermined thickness passes between the upper roll and the lower roll, only the self-weights of the upper mount and the upper roll act as the pressure applied to the unit cell, wherein if the unit cell having a thickness greater than the predetermined thickness passes between the upper roll and the lower roll, force applied from the bracket in addition to the self-weights of the upper mount and the upper roll is added to act as the pressure applied to the unit cell.

10. The pressing method of claim 7, further comprising a step of mounting a stopper between the lower mount and the upper mount before the unit cell passes therethrough so that the lower roll and the upper roll are spaced apart from each other.

11. A unit cell manufactured through the pressing method of claim 7.

12. The pressing roll device of claim 1, wherein the clamping portion of the bracket is interposed between the top surface of the upper mount and the bottom surface of the expansion portion.

13. The pressing roll device of claim 1, wherein the clamping portion of the bracket defines a lower part of the internal space of the bracket.

14. The pressing roll device of claim 1, wherein the clamping portion has a first part and a second part that are separate from each other horizontally along the top surface of the upper mount, and wherein the body portion extends vertically between the first part and the second part of the clamping portion.

15. The pressing roll device of claim 1, wherein the expansion portion of the head part is in a single piece that extends across substantially an entire width of the internal space.

16. The pressing roll device of claim 1, wherein the two parts of the body portion are directly connected to the head part.

\* \* \* \* \*